(12) United States Patent
Hutton

(10) Patent No.: US 7,685,838 B2
(45) Date of Patent: Mar. 30, 2010

(54) GROUND-BASED AIRCRAFT AIR CONDITIONER WITH THERMAL STORAGE

(75) Inventor: Neil Hutton, Ottawa (CA)

(73) Assignee: DEW Engineering and Development ULC, Ottawa, Ontario (CA)

( * ) Notice: Subject to any disclaimer, the term of this patent is extended or adjusted under 35 U.S.C. 154(b) by 1056 days.

(21) Appl. No.: 11/370,864

(22) Filed: Mar. 9, 2006

(65) Prior Publication Data
US 2007/0209383 A1   Sep. 13, 2007

(51) Int. Cl.
*F25D 17/02* (2006.01)
(52) U.S. Cl. .............................. 62/434; 62/430; 62/513
(58) Field of Classification Search .................... 62/430, 62/434, 237, 278, 513
See application file for complete search history.

(56) References Cited
U.S. PATENT DOCUMENTS

| | | | | |
|---|---|---|---|---|
| 2,694,537 A | * | 11/1954 | Reichert | .................. 244/118.5 |
| 3,156,101 A | * | 11/1964 | McGuffey | .................... 62/223 |
| 4,632,019 A | * | 12/1986 | Whiteman | .................... 454/76 |
| 4,835,977 A | | 6/1989 | Haglund et al. | |
| 5,031,690 A | * | 7/1991 | Anderson et al. | ............. 165/43 |
| 5,383,335 A | * | 1/1995 | Anderson et al. | .............. 62/89 |
| 7,089,756 B2 | * | 8/2006 | Hu | .............................. 62/435 |

\* cited by examiner

*Primary Examiner*—Melvin Jones
(74) *Attorney, Agent, or Firm*—Freedman & Associates

(57) ABSTRACT

A preconditioned air system for cooling an interior cabin space of a parked aircraft includes a thermal energy storage unit, which contains a thermal energy storage medium for storing cooling capacity. During use, a ground-based air-cooling unit is placed in thermal communication with the thermal energy storage medium. The ground-based air-cooling unit draws upon cooling capacity that has been stored previously within the thermal storage medium for cooling the interior cabin space. Storage of cooling capacity is performed during off-peak demand times and/or during low power cost times. System modularity supports cooling of variously sized aircraft even under extreme temperature conditions.

14 Claims, 10 Drawing Sheets

GROUND-BASED AIRCRAFT AIR CONDITIONER WITH THERMAL STORAGE

FIELD OF THE INVENTION

The instant invention relates generally to ground-based air conditioner systems of the type that are used for cooling the passenger cabin space of a parked aircraft, and more particularly to a ground-based aircraft air conditioner system with thermal storage.

BACKGROUND OF THE INVENTION

A number of systems have been developed over the years to satisfy the requirement of maintaining the temperature of the passenger cabin of modern day aircraft at a level that is comfortable to the passengers during the time the aircraft is parked. In such aircraft, the high density of passengers, the interior lighting, the large number of windows, and the heavily insulated fuselage all contribute to raising the temperature of the cabin of the parked aircraft to uncomfortable levels. Accordingly, it is necessary to provide a cooling system to lower the aircraft cabin temperature, even when the aircraft is parked in locations with relatively cool outside ambient temperatures.

One type of prior art system for cooling the cabin of a parked aircraft utilizes an on-board auxiliary power unit which is generally a small, jet-fueled turbine. The turbine, which is operated when the aircraft is parked, is used to power the on-board cooling system. During flight, the main engines power the cooling system.

Another type of prior art system for cooling the cabin of a parked aircraft utilizes one or more on-board air cycle machines, which are special-purpose heat pumps. These machines cool the cabin air when they are supplied with a source of high-pressure, high temperature air. During flight, the source of air is an on-board compressor driven by the main engines. When the aircraft is parked, a ground-based air compressor is connected to the aircraft to drive the heat pumps. This connection is made using a hose which links the compressor to a heat pump connector provided on the outer surface of the aircraft fuselage.

Yet another type of system for cooling the cabin of a parked aircraft utilizes a ground-based air conditioner unit, which provides cool air under pressure directly into the cabin air-conditioning duct system. This ground-based air conditioner, which may be fixed in location or portable, is connected to the parked aircraft using a flexible hose. This hose links the air conditioner to a connector, provided on the exterior of the fuselage, which communicates directly with the cabin ducts. In this mechanization, there is no need to operate the on-board cooling system when the aircraft is parked.

Of the previously described types of cooling system, the ground-based air conditioner unit is generally recognized as being the most energy efficient. Typically, prior art ground-based air conditioner units require from one-fifth to one-tenth the energy of those systems employing on-board auxiliary power units, and from one-half to one-fourth the energy of those systems employing on-board air cycle machines.

Even though ground-based air conditioner systems are generally more efficient than many other types of cooling systems, they still require large amounts of power for their operation. For example, electrically operated air conditioner systems for large commercial jet aircraft may require in excess of three hundred and fifty kilowatts of power for their operation. This is a serious concern in applications where the air conditioner unit is located proximate the outboard end of a passenger boarding bridge. In such applications, the air conditioner unit draws on the power that is supplied to the passenger boarding bridge, and thereby reduces the amount of power that is available during peak demand for other applications, such as auto-leveling, interior lighting, etc.

While conventional systems have been suggested which utilize ground based power supplies, the continuing problem exists of adapting such systems to the requirements of different sized aircraft. Presently, there exists a multitude of aircraft models and types, each with their own respective passenger carrying capacity and cabin configuration. In large part the cooling requirements for a preconditioned air unit are determined by the number of passengers being housed within the cabin being supplied with preconditioned air, as well as the internal air distribution network and the overall spatial dimensions of the cabin. It follows that a particular preconditioned air system designed for servicing a given number of passengers and cabin configuration may prove inadequate for servicing an aircraft having a significantly larger or smaller passenger capacity and cabin configuration.

It would be advantageous to provide a preconditioned air system that is adaptable to different operating requirements depending upon aircraft size, passenger load, ambient conditions, etc.

SUMMARY OF EMBODIMENTS THE INVENTION

It is an object of the instant invention to provide an apparatus and method for cooling the cabins of parked aircraft that overcomes some of the above-mentioned limitations of the prior art.

It is an object of the instant invention to provide an apparatus and method suitable for use with a plurality of different aircraft types, including large commercial aircraft and smaller regional aircraft.

According to one aspect, the instant invention enables the discharge of cooled air for cooling the passenger cabin of an aircraft during a period of time, without operating a conventional air conditioning unit during at least a portion of the period of time. For instance, air is passed over a thermal storage medium, so as to cool the air prior to it being provided into the cabin of the parked aircraft. Optionally, this is achieved by passing air over a heat exchanger that is in thermal communication with the thermal storage medium, or by passing air directly over the thermal storage medium.

According to another aspect, the instant invention enables the discharge of cooled air while at the same time operating a conventional air conditioning unit. For instance, a thermal storage medium is used to augment the operation of the conventional air conditioning unit. In this way, super-cooled air may be produced for cooling quickly an aircraft cabin or for maintaining a desired cabin temperature under extremely hot ambient conditions. Alternatively, one of the conventional air conditioning unit and the thermal storage unit may be used selectively to cool a small aircraft, or an aircraft housing few passengers, such as for example a regional jet. When it is necessary to cool a larger aircraft, then both units are used, or one unit is used continuously and the other unit is used intermittently to augment the cooling capacity of the first unit, as required.

According to another aspect of the instant invention, a ground based air conditioner unit is provided with a mounting structure. The mounting structure is for detachably mounting a thermal storage unit thereto. For example, a plurality of thermal storage units may be charged in a centralized area of the airport, wheeled out to the ground based air conditioners in a charged state, coupled to the ground based air conditioners, and used to cool aircraft cabins. Optionally, the thermal storage units are used until discharged to a predetermined level, at which point the discharged units are returned to the centralized area of the airport to be recharged. Alternatively, the thermal storage units are at least partially recharged during off-peak time using the ground based air conditioner unit, as described above. Since aircraft gate assignments are known well in advance of the aircraft actually arriving, and to a lesser extent the outside ambient temperatures may be predicted, the need to provide a charged thermal unit at particular locations and at particular times can be scheduled.

According to yet another aspect of the instant invention, a thermal storage air conditioner for use with parked aircraft is provided. A non-limiting example includes a thermal storage air conditioner for being disposed proximate an outboard end of a passenger boarding bridge. During use, the outboard end of the passenger boarding bridge is positioned adjacent to an exterior cabin door of the aircraft so as to provide a covered walkway for supporting passenger movement between the aircraft and a terminal building. The thermal storage air conditioner is disposed, for example, below the passenger boarding bridge, and includes supply conduits for connection to a connector, provided on the exterior of the aircraft fuselage, which communicates directly with the cabin ducts.

According to still another aspect of the instant invention, there is provided a preconditioned air system for cooling an interior cabin space of a parked aircraft, comprising: a thermal energy storage unit including a thermal energy storage medium; a ground-based air cooling unit in thermal communication with the thermal energy storage medium; and, a controller for selectably switching the preconditioned air system between an air cooling mode for providing preconditioned air to the parked aircraft and a charging mode for operating the ground-based air cooling unit to store cooling capacity within the thermal energy storage medium.

According to still another aspect of the instant invention, there is provided a preconditioned air system for cooling an interior cabin space of a parked aircraft, comprising: an air-cooling unit including an air inlet, a blower fan, a condenser, a compressor, an expansion device, an evaporator, a condenser fan, and an air outlet; and, a mounting structure proximate the air outlet of the preconditioned air unit for receiving a complimentary mounting structure of a thermal energy storage unit, for supporting detachable coupling of a thermal energy storage unit to the air-cooling unit.

According to still another aspect of the instant invention, there is provided a method of providing preconditioned air for cooling an interior cabin space of a parked aircraft, comprising: providing a thermal energy storage medium in thermal communication with a ground-based air-cooling unit; operating the ground-based air-cooling unit in a first operating mode during a first period of time, the first operating mode for charging the thermal energy storage medium; during a second period of time, providing a flow of air at a first temperature in thermal communication with the thermal energy storage medium, so as to discharge the thermal energy storage medium during the second period of time and to thereby change the temperature of the flow of air from the first temperature to a second temperature that is lower than the first temperature; and, directing the flow of air at the second temperature to an interior cabin space of the parked aircraft.

According to still another aspect of the instant invention, there is provided a method of providing preconditioned air for cooling an interior cabin space of a parked aircraft, comprising: charging a thermal energy storage medium at a charging location remote from an aircraft parking location; transporting the charged thermal energy storage medium to the aircraft parking location; thermally coupling the charged thermal energy storage medium to a ground-based air cooling unit at the aircraft parking location; and, in cooperation with the ground-based air cooling unit, discharging the charged thermal energy storage medium to provide a flow of air at a desired temperature that is lower than an outside ambient temperature, the flow of air for cooling a parked aircraft.

According to still another aspect of the instant invention, in a preconditioned air unit for cooling an interior cabin space of a parked aircraft, the preconditioned air unit comprising an air inlet, a blower fan, a compressor, an expansion device, a condenser, an evaporator and a condenser fan, there is provided an improvement comprising: a thermal energy storage module in thermal communication with the preconditioned air unit, the thermal energy storage module comprising: a thermal energy storage medium; a heat exchanger for thermally coupling the thermal energy storage medium to the preconditioned air unit, and to support charging and discharging of the thermal energy storage medium; and, an air director for directing a flow of air at a first temperature toward the heat exchanger and into thermal contact with the thermal energy storage medium, so as to discharge the thermal energy storage medium and to change the temperature of the flow of air from the first temperature to a second temperature that is lower than the first temperature.

BRIEF DESCRIPTION OF THE DRAWINGS

Embodiments of the instant invention will now be described in conjunction with the following drawings, in which:

FIG. 8a is a schematic illustration of the system of FIG. 7a;

FIG. 9b is a simplified top view of the thermal storage unit of FIG. 9a;

DETAILED DESCRIPTION OF EMBODIMENTS OF THE INVENTION

The following description is presented to enable a person skilled in the art to make and use the invention, and is provided in the context of particular applications thereof. Various modifications of the disclosed embodiments will be apparent to those of skill in the art, and the general principles defined herein are readily applied to other embodiments and applications without departing from the spirit and scope of the invention. Thus, the present invention is not intended to be limited to the embodiments disclosed, but is to be accorded the widest scope consistent with the principles and features disclosed herein.

Figure 1:
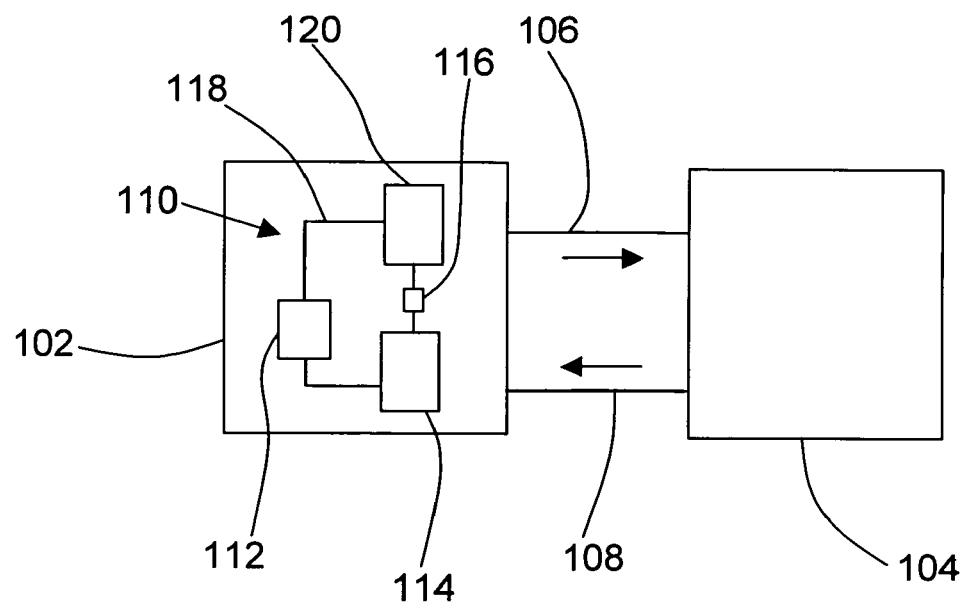
FIG. 1 is a schematic block diagram of a prior art preconditioned air system.

Referring to FIG. 1, shown is a schematic block diagram of a prior art preconditioned air system. An air-cooling unit 102 is coupled to a parked aircraft 104 via air supply duct 106 and air return duct 108. Optionally, the air-cooling unit 102 is mounted adjacent a top, lower or side surface of a passenger boarding bridge, or is a mobile unit that is mounted on a wheeled vehicle, such as for instance a truck. The air-cooling unit 102 typically is provided in the form of a conventional refrigeration system comprising a volume of refrigerant that is contained within a refrigeration circuit 110, which includes a compressor 112, a condenser 114, an expansion device 116, interconnecting tubing 118, and evaporator tubes 120. During use, power is provided to the compressor 112 for compressing the refrigerant so as to form hot, high-pressure refrigerant in the gas phase. The hot gas passes through condenser 114, condenses to a liquid, and enters expansion device 116 where it evaporates to become cold, low-pressure refrigerant gas. The cold gas runs through evaporator tubes 120, and in the process cools a flow of air passing therethrough. The cooled air is transferred via air supply duct 106, and is distributed throughout the passenger cabin of aircraft 104 by a not-illustrated cabin air-duct system. Air that is drawn out of the passenger cabin of aircraft 104 is returned to the air-cooling unit 102 via air return duct 108.

Figure 2:
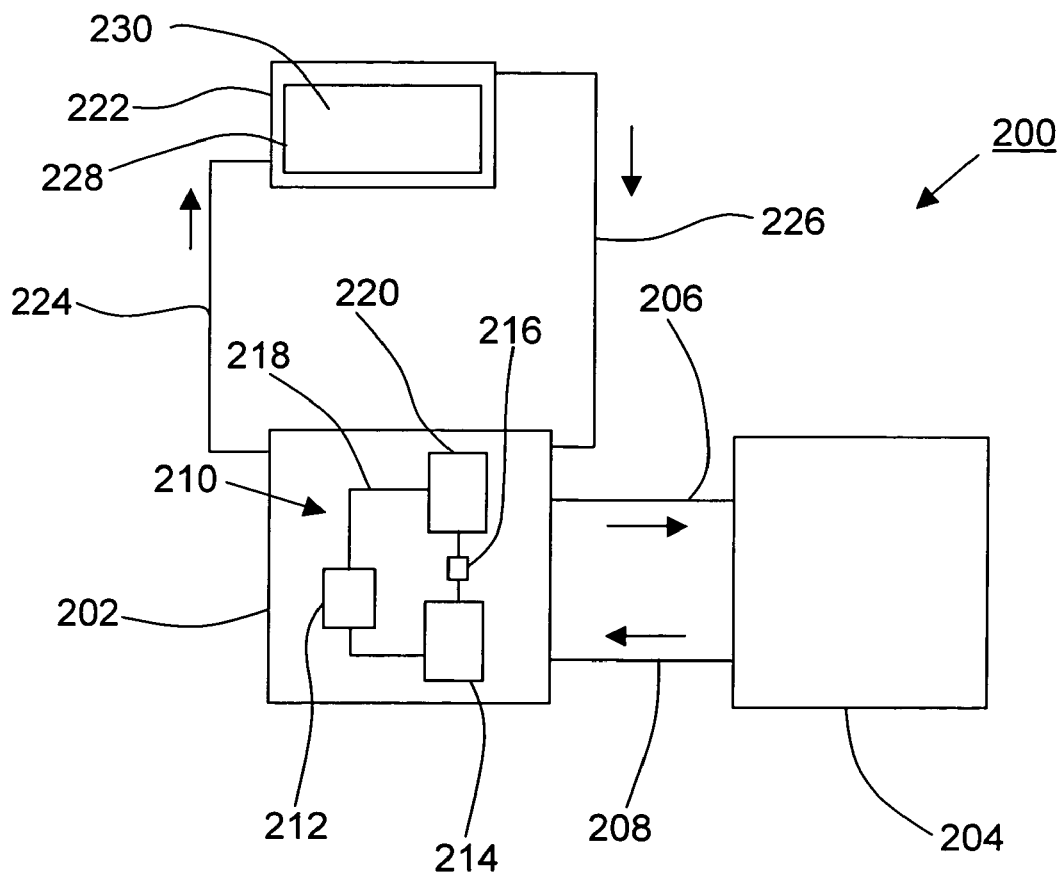
FIG. 2 is a schematic block diagram of a preconditioned air system with thermal storage, according to an embodiment of the instant invention.

Referring now to FIG. 2, shown is a schematic block diagram of a preconditioned air system with thermal storage, shown generally at 200, according to an embodiment of the instant invention. By way of a specific and non-limiting example, the air-cooling unit 202 that is shown in FIG. 2 is a conventional refrigeration system comprising a volume of refrigerant that is contained within a refrigeration circuit 210, which includes a compressor 212, a condenser 214, an expansion device 216, interconnecting tubing 218, and evaporator tubes 220. During use, power is provided to the compressor 212 for compressing the refrigerant so as to form hot, high-pressure gas phase refrigerant. The hot gas passes through condenser 214, condenses to a liquid, and enters expansion device 216 where it evaporates to become cold, low-pressure refrigerant gas. The cold gas runs through evaporator tubes 220, and in the process cools a flow of air passing therethrough.

Referring still to FIG. 2, the air-cooling unit 202 is coupled to a thermal storage unit 222 via tubing 224 and 226. The thermal storage unit 222 includes a thermal store 228 for storing thermal energy during off-peak time for use during other times. To this end, the thermal store includes a thermal storage medium, which is optionally one of a concentrated liquid desiccant solution, a chilled water storage medium, a hydrate cooling medium (including but not limited to clathrate hydrates), and an ice storage medium, as just a few specific and non-limiting examples. Furthermore, the instant invention envisages use of thermal storage media that are corrosive and/or that expand on freezing.

Optionally, the preconditioned air system with thermal storage 200 is mounted to one of a top surface, a side surface and a lower surface of a passenger boarding bridge. In that case, typically power is drawn from the power that is provided to the passenger boarding bridge. Alternatively, the preconditioned air system with thermal storage 200 is a mobile unit, for instance mounted on a truck or on a wheeled cart. Often, a diesel generator is used to power mobile preconditioned air units, but optionally the mobile preconditioned air unit plugs into the main electrical grid of the airport terminal building.

Generally speaking, the air-cooling unit 202 is operated to charge the thermal store 228 during periods of time that air-cooling is not required. For instance, the conventional air-cooling unit 202 is operated to charge the thermal store when no aircraft are parked within a parking space that is serviced by the preconditioned air system with thermal storage 200. During this time, other functions such as interior lighting, auto-leveling, etc. are not required, and accordingly the power that is consumed by the conventional air conditioning unit is not a concern. To charge the thermal store, for instance, refrigerant from air-cooling unit 202 flows into a cooling coil through a supply line, absorbing heat from the thermal store and then flows out of the cooling coil through a discharge line and returns to the compressor and condenser of the air-cooling unit 202, where the absorbed heat is released.

Figure 3:
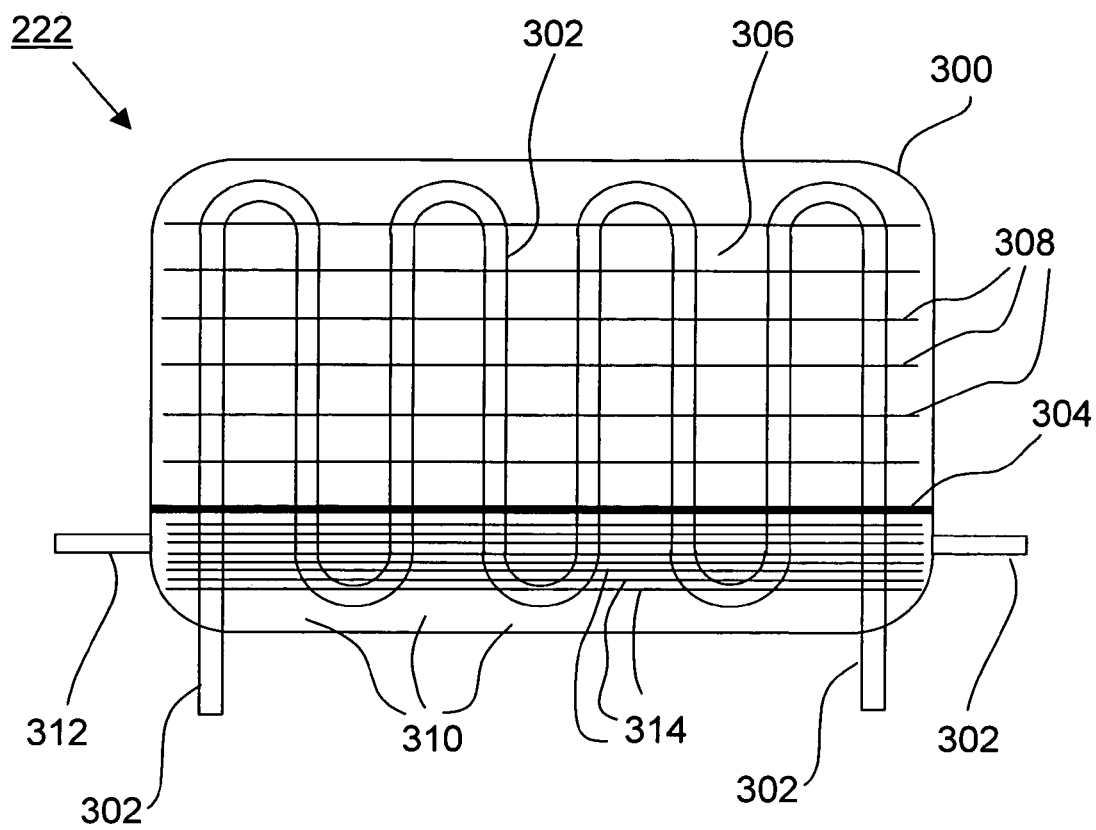
FIG. 3 is a schematic illustration of the internal components of a thermal energy storage apparatus.

By way of a specific and non-limiting example, the thermal storage unit 222 is of a type that uses low cost and thermally efficient fin and tube heat exchangers, as described for instance in U.S. Pat. No. 5,524,453, which issued Jun. 11, 1996 in the name of James, the entire contents of which is incorporated by reference herein. Referring to FIG. 3, the thermal storage unit 222 includes an insulated container 300 enclosing a serpentine-tube heat exchanger 302, the container also being divided into two volumes by a barrier 304. Barrier 304 does not block flow in tube 302. A thermal energy storage (TES) medium 306 that is capable of absorbing and releasing large quantities of heat fills the upper volume surrounding and in direct physical and thermal contact with the fins 308 and tube 302 heat exchanger. A liquid 310 circulating through the lower volume via tubes 312 making intimate thermal and physical contact with the tubes 302 and fins 314 of the heat exchanger fills the lower volume. The barrier 304 serves to separate the TES material and the circulating liquid 310.

Figure 4:
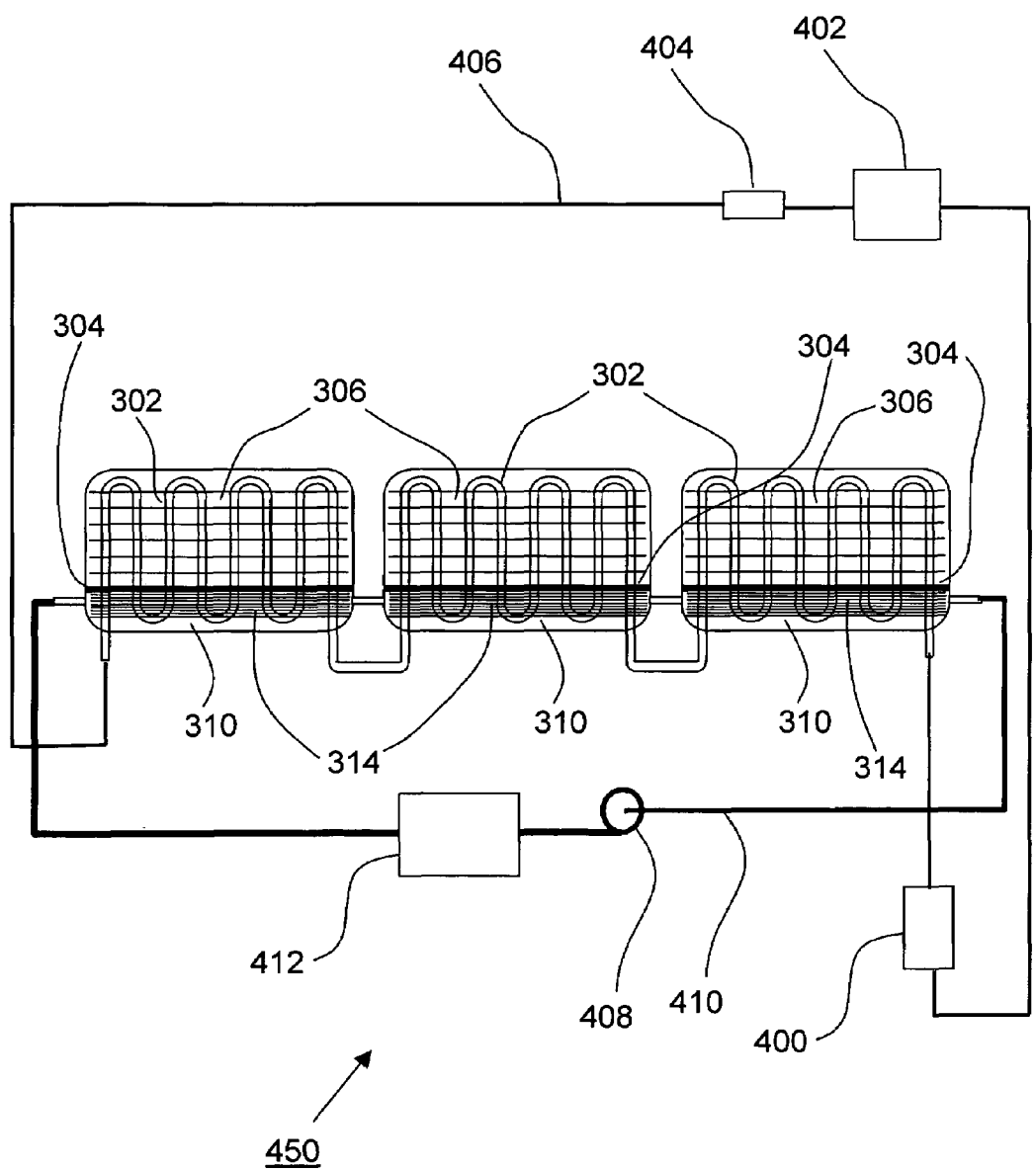
FIG. 4 is a schematic illustration of a preconditioned air system with thermal storage, according to an embodiment of the instant invention.

Referring now to FIG. 4, shown is a schematic diagram of a preconditioned air system with thermal storage 450 similar to that shown in FIG. 2, but with three thermal storage units 222 of FIG. 3 connected together in series. A conventional refrigeration system comprising a volume of refrigerant that is contained within a refrigeration circuit is provided in thermal communication with the three thermal storage units 222. The conventional refrigeration system further comprising a compressor 400, a condenser 402, an expansion device 404, interconnecting tubing 406 and evaporator tubes 302 removes heat from both the TES medium 306 and circulating liquid 310 when the compressor 400 is energized. A circulating pump 408, circulating liquid 310, interconnecting piping 410, a heat accepting heat exchanger 412, and three heat exchangers comprising tubes 302 and fins 314 situated within the TES modules below barriers 304 comprise a chilled water cooling circuit. Heat rejected from the circulating liquid 310 to the lower three heat exchangers situated within the TES modules below barriers 304 is absorbed by passive melting of the TES medium via heat transfer in the vertical heat pipes or by conventional cooling with compressor 400 energized.

Optionally, the preconditioned air system with thermal storage 450 is mounted to one of a top surface, a side surface and a lower surface of a passenger boarding bridge. In that case, typically power is drawn from the power that is provided to the passenger boarding bridge. Alternatively, the preconditioned air system with thermal storage 450 is a mobile unit, for instance mounted on a truck or on a wheeled cart. Often, a diesel generator is used to power mobile preconditioned air units, but optionally the mobile preconditioned air unit plugs into the main electrical grid of the airport terminal building.

There are three distinct operating modes for the preconditioned air system with thermal storage 450. They are 1) ice making for storing cooling capacity, 2) cooling by melting ice, and 3) cooling by combined ice melting and conventional refrigeration.

In the ice making mode (1) the conventional refrigeration system including compressor 400, condenser 402, expansion device 404, interconnecting tubing 406, and evaporator tubes 302 removes heat from the TES medium 306, such as for instance water, until the TES medium 306 freezes.

During the cooling by melting ice mode (2), heat is accepted by heat exchanger 412 in thermal contact with the refrigerated space and the circulating liquid 310 hence warming liquid 310. Pump 408 and interconnecting piping 410 force liquid 310 over fins 314 and tube 302 heat exchanger below barrier 304. Heat from liquid 310 causes refrigerant in tube 302 to boil hence cooling liquid 310. The vaporized refrigerant travels up tube 302 recondensing by transferring heat to the TES medium 306 and melting it. The recondensed refrigerant returns by gravity to the region inside tube 302 below barrier 304 to repeat the cycle until all of the TES medium 306 melts.

In the cooling by combined TES medium melting and conventional refrigeration mode (3), melting TES medium 306 provides cooling capacity in addition to that provided by the conventional refrigeration system. Both the conventional refrigeration system and the melting TES medium 306 remove heat from the circulating liquid 310 through the fins 314 and tube 302 heat exchanger. Mode (3) permits using a smaller compressor 400 and condenser 402 than would otherwise be required for a given peak cooling capacity.

Figure 5:
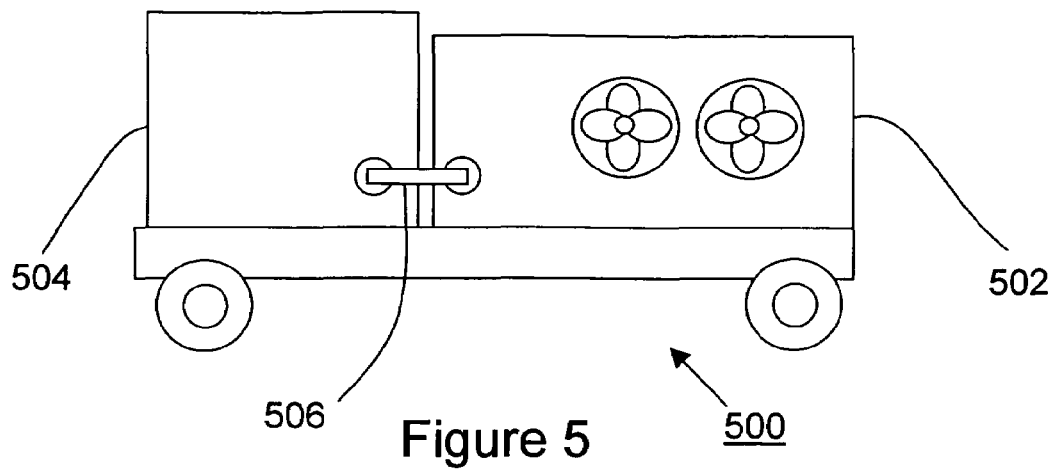
FIG. 5 is a schematic illustration of a mobile preconditioned air system with thermal storage, according to an embodiment of the instant invention.

Referring now to FIG. 5, shown is a schematic illustration of a mobile preconditioned air system with thermal storage, according to an embodiment of the instant invention. The mobile preconditioned air system with thermal storage, shown generally at 500, includes a conventional air-cooling unit 502 that is mounted permanently on a truck or wheeled cart. A thermal storage unit 504 also is mounted on the truck or wheeled cart and adjacent to the conventional air-cooling unit 502. Interconnecting tubing 506 provides thermal communication between the conventional air-cooling unit 502 and the thermal storage unit 504. The thermal storage unit 504 optionally is mounted permanently or removably on the truck or wheeled cart. When the thermal storage unit 504 is mounted permanently on the truck or wheeled cart, then charging of the thermal storage unit 504 is accomplished optionally by operating the conventional air-cooling unit 502 to cool the thermal storage medium, or by returning the entire mobile preconditioned air system with thermal storage 500 to a centralized recharging site. When the thermal storage unit 504 is mounted removably on the truck or wheeled cart, then charging of the thermal storage unit 504 is accomplished optionally by removing the thermal storage unit for recharging at a centralized recharging site. Further optionally, the thermal storage unit 504 is removed and replaced with an already charged thermal storage unit. The thermal storage unit 504 subsequently is returned to the centralized recharging site and is recharged.

Figure 6A:
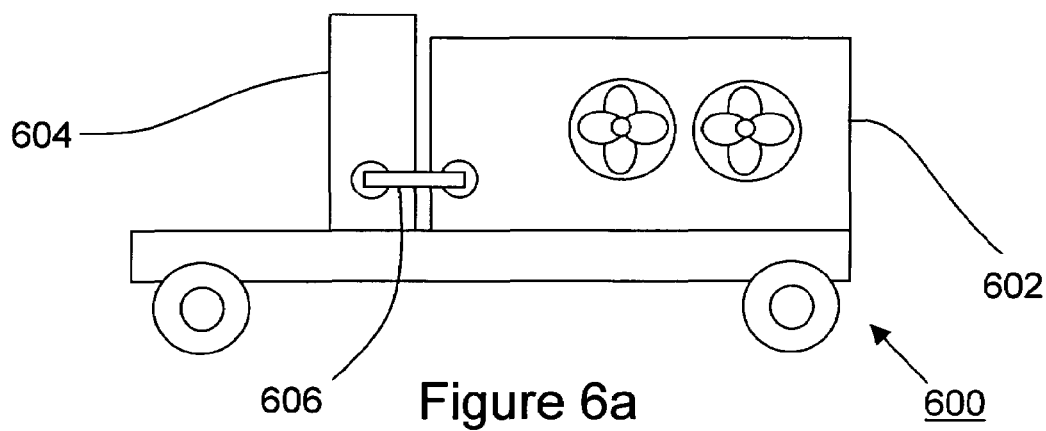
FIG. 6a is a schematic illustration of a mobile preconditioned air system with a modular thermal storage, according to an embodiment of the instant invention, in which one thermal storage module is provided.

Referring now to FIG. 6a, shown is a schematic illustration of a mobile preconditioned air system with a modular thermal storage, according to an embodiment of the instant invention, in which one thermal storage module is provided. The mobile preconditioned air system with a modular thermal storage, shown generally at 600, includes a conventional air-cooling unit 602 that is mounted permanently on a truck or wheeled cart. A first thermal storage module 604 also is mounted on the truck or wheeled cart and adjacent to the conventional air-cooling unit 602. Interconnecting tubing 606 provides thermal communication between the conventional air-cooling unit 602 and the first thermal storage module 604. The first thermal storage module 604 optionally is mounted permanently or removably on the truck or wheeled cart. When the first thermal storage module 604 is mounted permanently on the truck or wheeled cart, then charging of the first thermal storage module 604 is accomplished optionally by operating the conventional air-cooling unit 602 to cool the thermal storage medium, or by returning the entire mobile preconditioned air system with thermal storage 600 to a centralized recharging site. When the first thermal storage module 604 is mounted removably on the truck or wheeled cart, then charging of the first thermal storage module 604 is accomplished optionally by removing the first thermal storage module 604 for recharging at a centralized recharging site. Further optionally, the first thermal storage module 604 is removed and replaced with an already charged thermal storage module. The first thermal storage module 604 subsequently is returned to the centralized recharging site and is recharged.

Figure 6B:
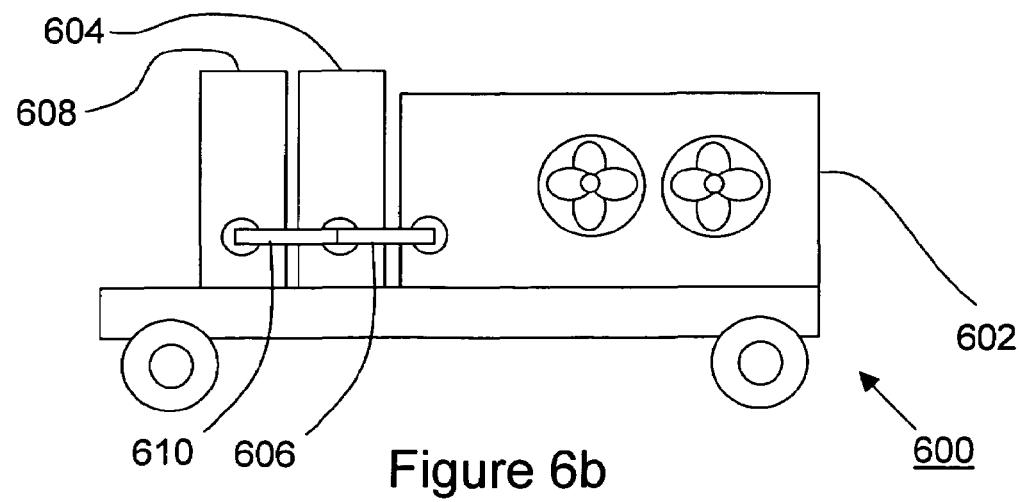
FIG. 6b is a schematic illustration of a mobile preconditioned air system with a modular thermal storage, according to an embodiment of the instant invention, in which two thermal storage modules are provided.

Referring now to FIG. 6b, shown is a schematic illustration of a mobile preconditioned air system with a modular thermal storage, according to an embodiment of the instant invention, in which two thermal storage modules are provided. A second thermal storage module 608 is connected in series with the first thermal storage module 604 via interconnecting tubing 610. In this case, the second thermal storage module 608 is removably mounted on the truck or wheeled cart. The second thermal storage module 608 increases the total thermal storage capacity of the system, so as to support longer operation times or cooler air temperatures than can be achieved using only the first thermal storage module 604.

Figure 6C:
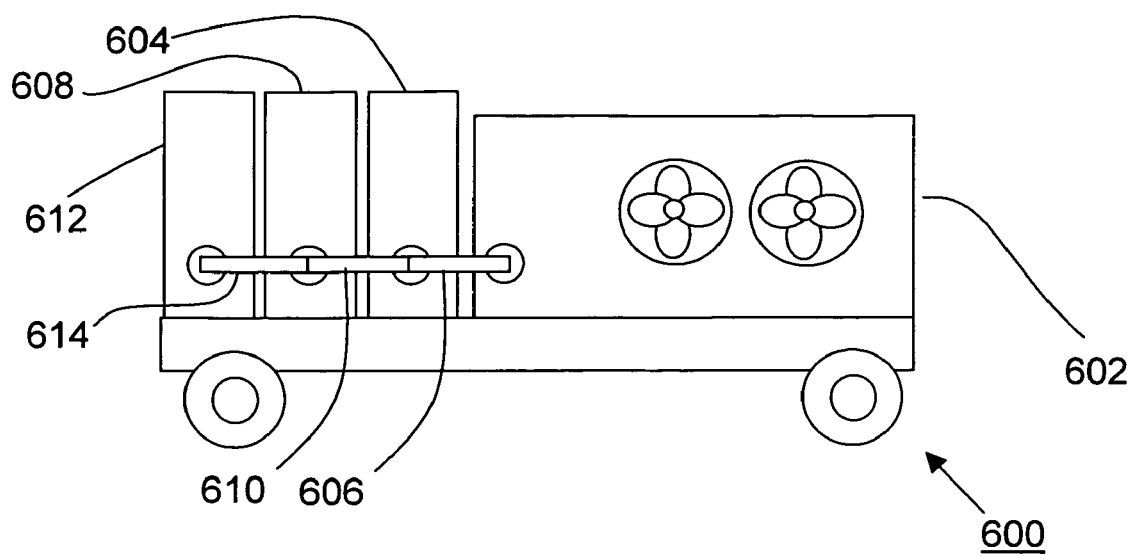
FIG. 6c is a schematic illustration of a mobile preconditioned air system with a modular thermal storage, according to an embodiment of the instant invention, in which three thermal storage modules are provided.

Referring now to FIG. 6c, shown is a schematic illustration of a mobile preconditioned air system with a modular thermal storage, according to an embodiment of the instant invention, in which three thermal storage modules are provided. A third thermal storage module 612 is connected in series with the second thermal storage module 608 and with the first thermal storage module 604 via interconnecting tubing 612. In this case, the third thermal storage module 612 is removably mounted on the truck or wheeled cart. The third thermal storage module 612 increases further the total thermal storage capacity of the system, so as to support longer operation times or cooler air temperatures than can be achieved using only the first thermal storage module 604 and the second thermal storage module 612.

Preferably, the interconnecting tubing that is illustrated in FIGS. 6a-6c includes quick-release type connectors and valve systems for supporting rapid assembly and disassembly of the modules 604, 608 and 612. The interconnecting tubing assembly/valve system is designed to prevent release of refrigerant gas from the system when modules are added or removed.

Another type of thermal storage modularity also may be envisaged, which is less likely to release refrigerant gas into the environment. In particular, an airport maintains a fleet of mobile preconditioned air systems with thermal storage similar to the one shown in FIG. 5, wherein thermal storage units 504 having different thermal storage capacities are mounted permanently on different vehicles. For instance, the airport maintains a fleet including high-capacity, mid-capacity, and low-capacity thermal storage units. The units are maintained and charged at one or more centralized charging stations, and then dispatched to various passenger boarding bridges depending upon the cooling capacity that is required given ambient temperature conditions, size of aircraft, number of passengers on the aircraft, etc.

Figure 7A:
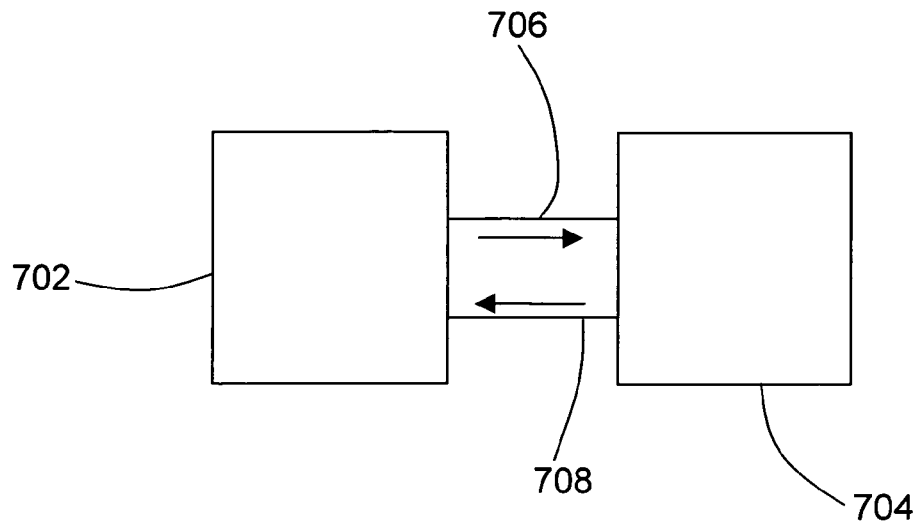
FIG. 7a is a schematic block diagram of a preconditioned air unit comprising a conventional refrigeration system that is connected to an aircraft via an air supply duct.
Figure 7B:
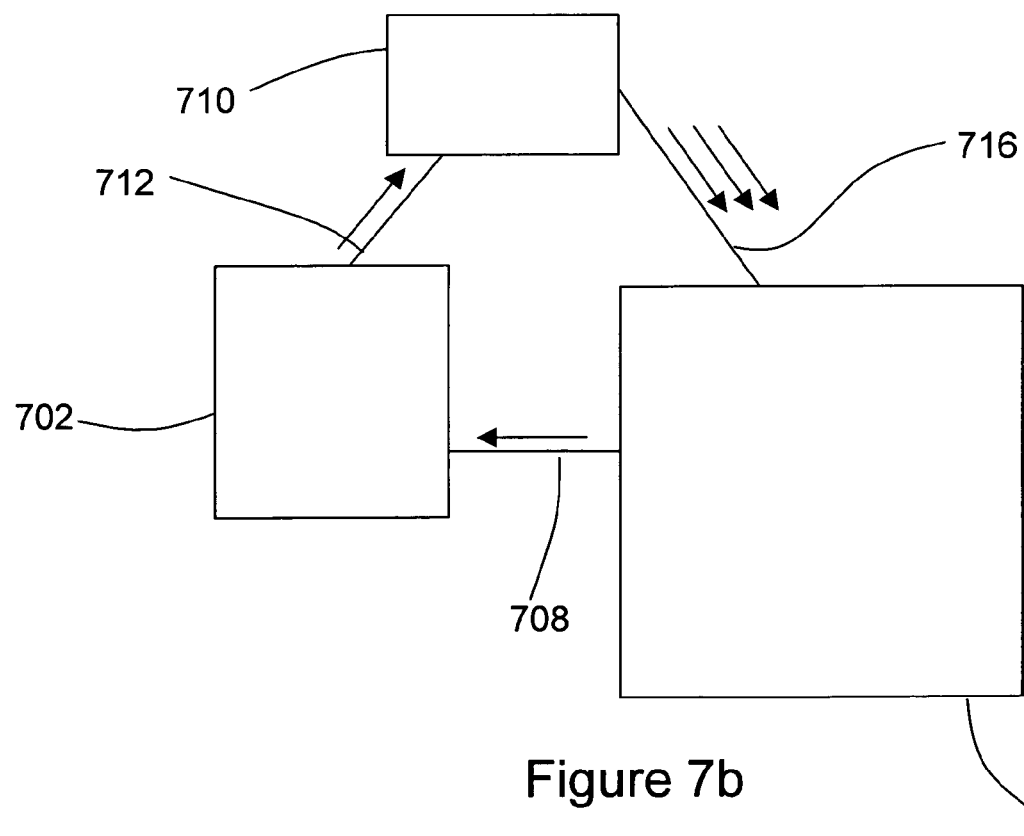
FIG. 7b is a schematic block diagram of a preconditioned air unit comprising a conventional refrigeration system connected to a mobile thermal storage unit via a cool air duct, the mobile thermal storage unit connected to an aircraft via an air supply duct.

Further optionally, the thermal storage unit is separated completely from the conventional air-conditioner type preconditioned air units, as is shown in FIGS. 7a and 7b. Referring now to FIG. 7a, shown is a schematic block diagram of a preconditioned air unit comprising a conventional air-cooling unit 702 connected to an aircraft 704 via air supply duct 706 and 708. In the specific and non-limiting example that is illustrated in FIG. 7a, the aircraft 704 is a regional passenger jet with a passenger load of 125 passengers. For the type of aircraft, the given passenger load, etc. the conventional air-cooling unit 702 is sufficient to meet the cooling needs of the aircraft 704. Referring now to FIG. 7b, shown is a schematic block diagram of a preconditioned air unit comprising a conventional air-cooling unit 702 connected to a mobile thermal storage unit 710 via a cool air duct 712. The mobile thermal storage unit 710 is connected to aircraft 714 via air supply duct 716. Air is returned to the conventional refrigeration system 702 via air return duct 708. In the specific and non-limiting example that is illustrated in FIG. 7b, the aircraft 714 is a wide body passenger jet with a passenger load of 315 passengers. For the type of aircraft, the given passenger load, etc. the conventional air-cooling unit 702 on its own is not sufficient to meet the cooling needs of the aircraft 714.

Accordingly, cool air from the conventional air-cooling unit 702 is diverted through the mobile thermal storage unit 710 to be cooled further prior to being introduced into the passenger cabin air duct system of aircraft 714. Optionally, the mobile thermal storage unit 710 is selected from a plurality of capacity types, such as for instance a high-cooling capacity thermal storage unit, a mid-cooling capacity thermal storage unit, and a low-cooling capacity thermal storage unit, in dependence upon the actual cabin size/configuration of the aircraft 714, outside ambient temperature conditions, etc. Further optionally, the cooled air is passed from the thermal storage unit to one or more (not illustrated) additional thermal storage units connected in series therewith, prior to being introduced into the passenger cabin air duct system of aircraft 714.

Advantageously, in the system that is illustrated in FIG. 7b the conventional air-cooling unit 702 and the mobile thermal storage unit 710 are connected only via air ducts. Accordingly, refrigerant gas does not move between the two separate units, and therefore the probability of releasing refrigerant gas into the environment is reduced significantly. Further advantageously, under very high cooling requirement conditions, or in circumstances where the cooling period is prolonged, additional mobile thermal storage units may be delivered to the aircraft stand and used to replace the mobile thermal storage unit 710 when it becomes discharged to a predetermined level. In this case, the air ducts 712 and 716 simply are detached from the mobile thermal storage unit 710 and quickly attached to the additional mobile thermal storage unit, without risk of causing a leak of refrigerant gas to the environment.

Figure 8A:
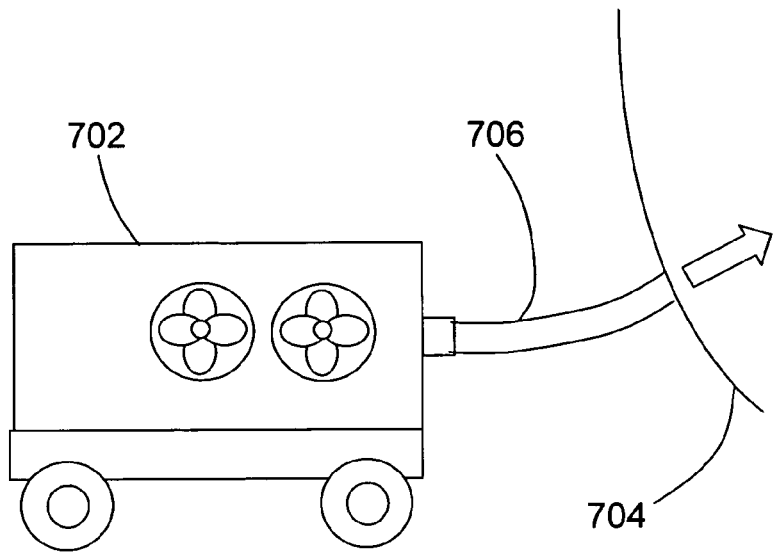

Referring now to FIG. 8a, shown is a schematic illustration of the system of FIG. 7a. The conventional air-cooling unit 702 is mounted on a wheeled cart in this specific example, but optionally is mounted on a truck. A large diameter air duct 706 connects the conventional air-cooling unit 702 to a connector that is provided on the exterior of the aircraft fuselage. The connector communicates directly with the cabin ducts for distributing the conditioned air throughout the cabin.

Figure 8B:
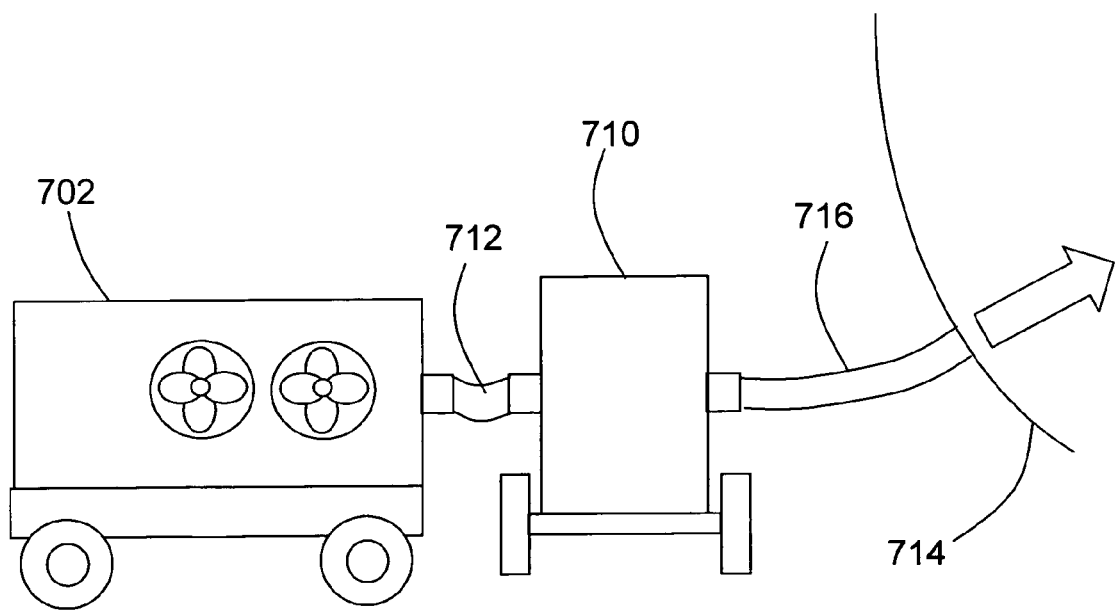
FIG. 8b is a schematic illustration of the system of FIG. 7b.

Referring now to FIG. 8b, shown is a schematic illustration of the system of FIG. 7b. The conventional air-cooling unit 702 is mounted on a wheeled cart in this specific example, but optionally is mounted on a truck. A large diameter air duct 712 connects the conventional air-cooling unit 702 to the mobile thermal storage unit 710, which also is mounted on a wheeled cart in this specific example. A second large diameter air duct 716 connects the mobile thermal storage unit 710 to a connector that is provided on the exterior of the aircraft fuselage. The connector communicates directly with the cabin ducts for distributing the conditioned air throughout the cabin.

Further optionally, the conventional air-cooling unit 702 is connected to a plurality of mobile thermal storage units in parallel. For instance, a Y-shaped adapter is provided at the cool air outlet of the conventional air-cooling unit 702, and the airflow provided therefrom divides into two separate streams, each stream passing through an air duct between the Y-shaped adapter and a different mobile thermal storage unit. Cool air ducts from each of the different mobile thermal storage units is recombined at a second Y-shaped adapter before being introduced into the aircraft cabin via the connector that is provided on the exterior of the aircraft fuselage. Advantageously, the flow volume of air through each of the different mobile thermal storage units is reduced such that the duration of a cooling period is increased relative to a system having only one thermal storage unit. Further optionally, the second Y-shaped adapter is omitted and cool air from only one of the mobile thermal storage units is provided into the aircraft cabin via the connector that is provided on the exterior of the aircraft fuselage. In this case, cool air from the other one of the mobile thermal storage units is directed for other uses, such as for instance cooling the interior of the passenger boarding bridge, cooling aircraft brakes when the turnaround time is insufficient for proper brake cooling, etc.

Figure 9A:
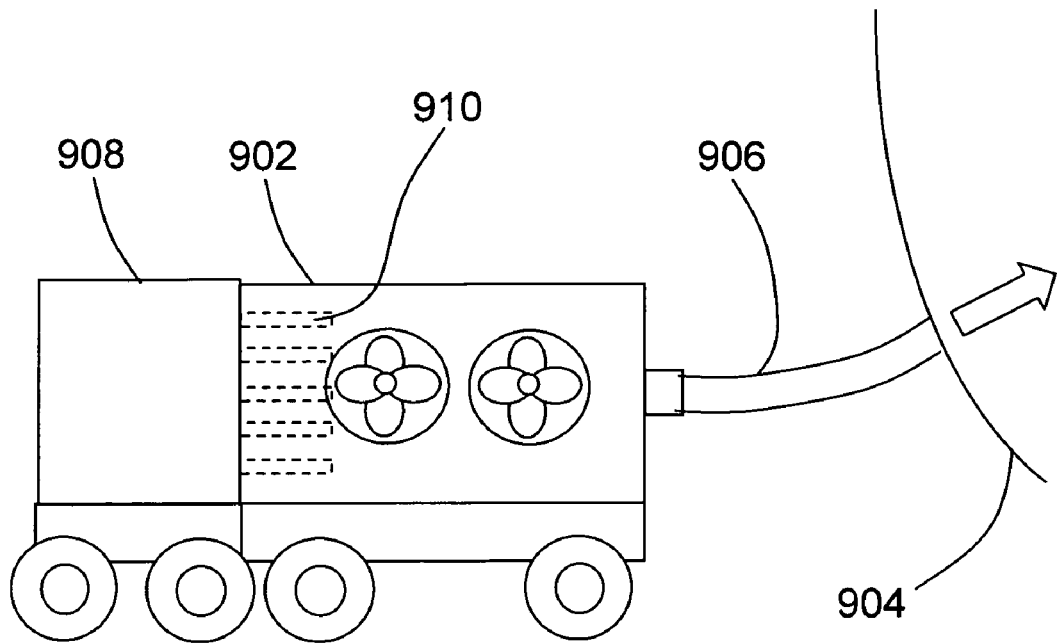
FIG. 9a is a schematic illustration of an alternative arrangement for a system in which the thermal storage unit is separated completely from the conventional air-conditioner type preconditioned air units.

Referring now to FIG. 9a, shown is a schematic illustration of an alternative arrangement for a system in which the thermal storage unit is separated completely from the conventional air-conditioner type preconditioned air units. A preconditioned air unit comprising a conventional air-cooling unit 902 is connected to an aircraft 904 via air supply duct 906. In the system of FIG. 9a, a thermal storage unit 908 includes externally accessible heat-sink structures 910, such as for instance a plurality of spaced-apart plates or fins. The thermal storage unit 908 is positioned adjacent to the conventional air-cooling unit 902, such that the externally accessible heat-sink structures 910 are received within slots of the conventional air-cooling unit 902. For instance, the slots are provided within an air-flow path into the aircraft 904, such that air moving along the flow path is cooled prior to entering the aircraft 904. Advantageously, the system of FIG. 9*a* supports transfer of cooling capacity from the thermal storage unit 908 to the conventional air-cooling unit 902, without moving refrigerant gas between the two separate units. Accordingly, the probability of releasing refrigerant gas into the environment is reduced significantly. Furthermore, the combined units of FIG. 9*a* are more compact and require less interconnecting ductwork, thereby freeing up valuable apron space.

Figure 9B:
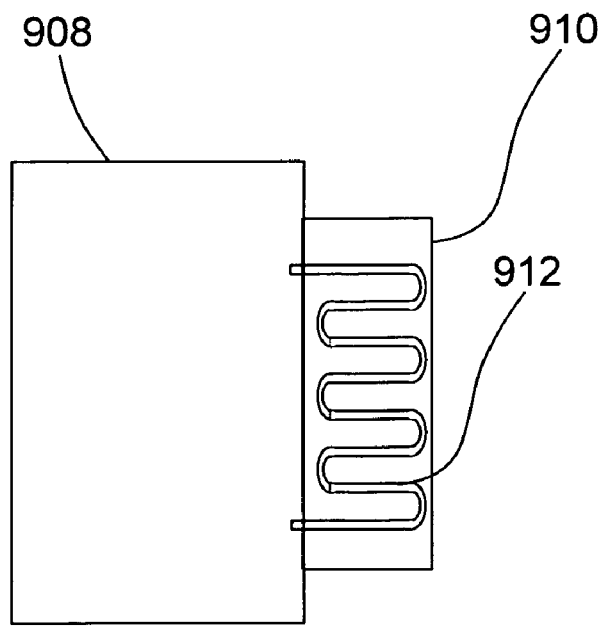

Referring now to FIG. 9*b*, shown is a simplified top view of the thermal storage unit 908 including one of the externally accessible heat-sink structures 910. The externally accessible heat-sink structure 910 is a large surface-area plate in thermal communication with the thermal storage medium, which is contained within thermal storage unit 908. Optionally, a conduit 912 is provided for circulating fluid through the externally accessible heat-sink structure 910, in order to more efficiently transfer cooling capacity to the conventional air-cooling unit 902.

In an alternative embodiment, the conventional air-cooling unit includes a plurality of externally accessible heat exchange structures, such as for instance a plurality of spaced-apart plates or fins, for being inserted into slots of a thermal storage medium. In this case, optionally a conduit is provided for circulating hot, high-pressure refrigerant in the gas phase through the externally accessible heat exchange structures, such that heat is transferred to the thermal storage medium, thereby causing the refrigerant to condense to a liquid. Accordingly, the thermal storage unit functions as a condenser in the refrigeration circuit.

Figure 10:
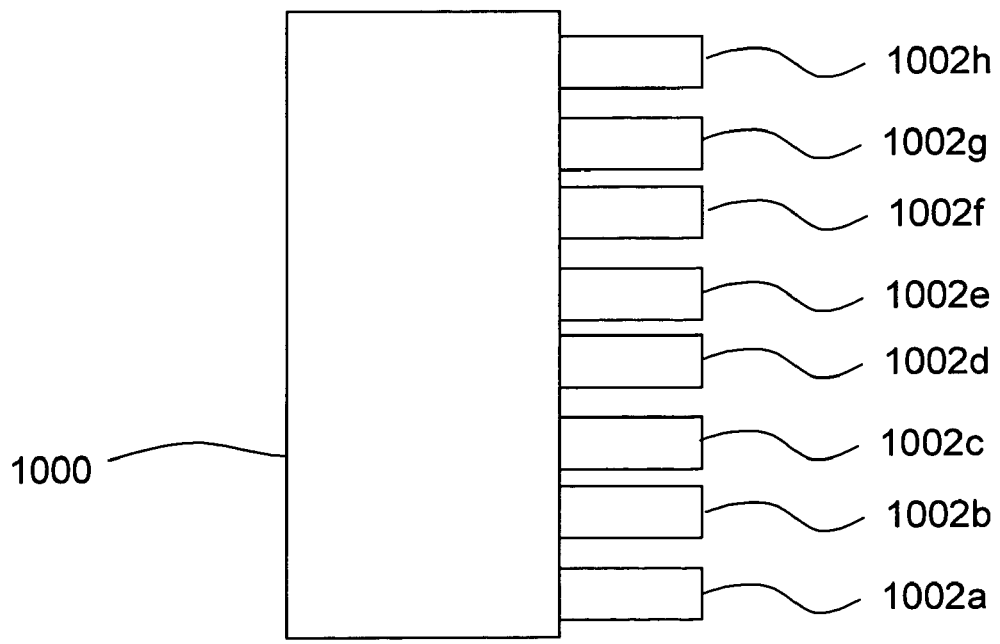
FIG. 10 is a schematic block diagram showing a plurality of thermal storage modules being recharged at a centralized cooling plant, according to an embodiment of the instant invention.

Referring now to FIG. 10, shown is a schematic block diagram showing a plurality of thermal storage modules/units 1002*a-h* being recharged at a centralized cooling plant, according to an embodiment of the instant invention. The thermal storage modules/units 1002*a-h* include any of the types of thermal storage modules/units described above. In particular, each of the thermal storage modules/units 1002*a-h* is placed in thermal communication with a centralized cooling system 1000. The configuration of the centralized cooling system 1000 is selected based on considerations such as cost, efficiency, required cooling capacity, desired recharge rate, etc. Suitable configurations for the centralized cooling system 1000 will be readily apparent to one of skill in the art. Advantageously, an airport environment lends itself well to centralized charging of thermal storage modules/units, for distribution to points of use during peak demand. In particular, aircraft are assigned to particular passenger boarding bridges well in advance of their expected time of arrival. Accordingly, thermal storage modules/units may be dispatched from the centralized cooling plant and assembled as necessary to form a suitable preconditioned air system prior to the aircraft parking at a gate.

Figure 11:
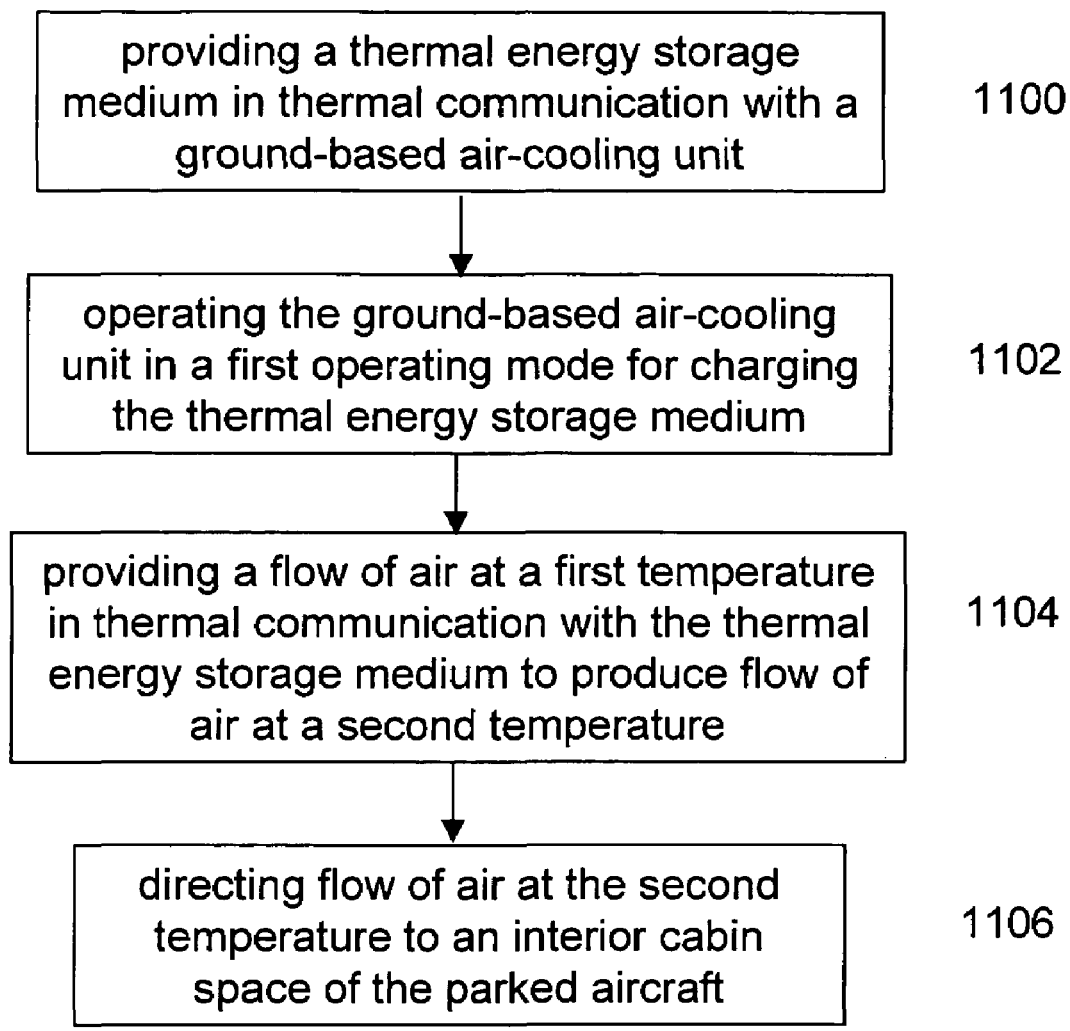
FIG. 11 is a simplified flow diagram of a method according to an embodiment of the instant invention; and, FIG. 12 is a simplified flow diagram of another method according to an embodiment of the instant invention.

Referring now to FIG. 11, shown is a simplified flow diagram of a method according to an embodiment of the instant invention. At step 1100 a thermal energy storage medium is provided in thermal communication with a ground-based air-cooling unit. At step 1102 the ground-based air-cooling unit is operated in a first operating mode during a first period of time, the first operating mode for charging the thermal energy storage medium. At step 1104, during a second period of time, a flow of air at a first temperature is provided in thermal communication with the thermal energy storage medium, so as to discharge the thermal energy storage medium during the second period of time and to thereby change the temperature of the flow of air from the first temperature to a second temperature that is lower than the first temperature. At step 1106 the flow of air at the second temperature is directed to an interior cabin space of the parked aircraft.

Figure 12:
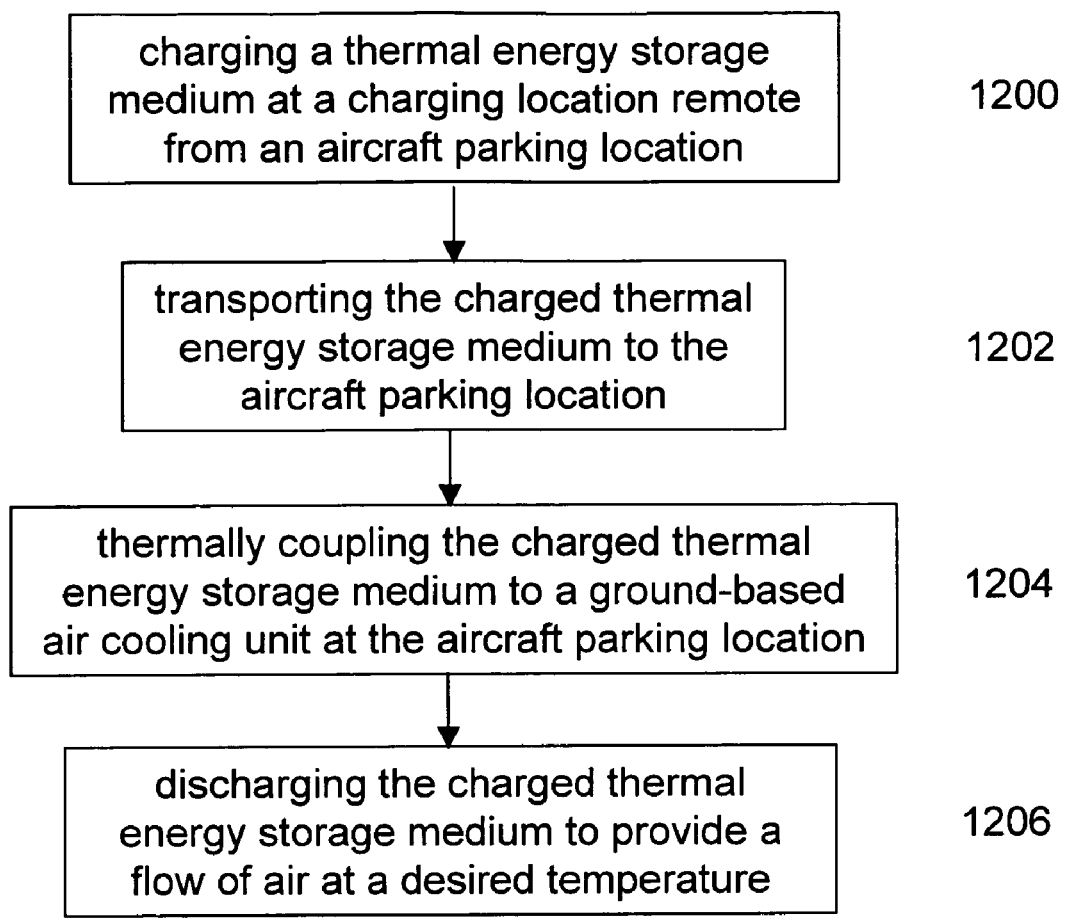

Referring now to FIG. 12, shown is a simplified flow diagram of another method according to an embodiment of the instant invention. At step 1200 a thermal energy storage medium is charged at a charging location remote from an aircraft parking location. At step 1202 the charged thermal energy storage medium is transported to the aircraft parking location. At step 1204 the charged thermal energy storage medium is thermally coupled to a ground-based air-cooling unit at the aircraft parking location. At step 1206, in cooperation with the ground-based air cooling unit, the charged thermal energy storage medium is discharged to provide a flow of air at a desired temperature that is lower than an outside ambient temperature, the flow of air for cooling a parked aircraft.

It is an advantage of at least one embodiment of the instant invention that the amount of energy that is required to operate the conventional air conditioning unit may be reduced during peak demand time, such as when an aircraft is parked adjacent to the passenger boarding bridge. In particular, the conventional air conditioning unit operates primarily during non-peak demand time to charge a thermal storage unit for later discharge. Since the thermal storage unit may be used to augment the cooling capacity of the conventional air conditioning unit, it is possible to install smaller, more energy efficient, conventional air conditioning units. Furthermore, by reducing the cycling on and off of the components of the conventional air conditioning unit, the lifetime of the unit is expected to be increased without a corresponding increase in maintenance costs.

Of course, in aircraft applications it is not a question of having to pay more for electricity in order to keep the passenger cabin cool, but of having to allocate a limited amount of power to operate all necessary systems for servicing the aircraft. Since air conditioning is related primarily to passenger comfort and not to safety, often the operation of a conventional air conditioning system must be reduced or suspended entirely when other systems raise the power requirements above what is available. This results in passenger discomfort but does not create significant safety concerns. Alternatively, by switching over at least temporarily to a TES system as described above, the cabin temperature may be maintained at a comfortable level using a minimal amount of power, even during a peak demand time.

Numerous other embodiments may be envisaged without departing from the spirit and scope of the invention.

What is claimed is:

1. A preconditioned air system for cooling an interior cabin space of a parked aircraft, comprising:
    a thermal energy storage unit including a thermal energy storage medium;
    a ground-based air cooling unit in thermal communication with the thermal energy storage medium; and,
    a controller for selectably switching between an air cooling mode for providing preconditioned air to the parked aircraft and a charging mode for operating the ground-based air cooling unit to store cooling capacity within the thermal energy storage medium.

2. A preconditioned air system according to claim 1, wherein the ground-based air cooling unit is a conventional refrigeration system comprising an air inlet, a blower fan, a compressor, an expansion device, a condenser, an evaporator and a condenser fan.

3. A preconditioned air system according to claim 1, wherein the thermal energy storage unit comprises an insulated container for containing the thermal energy storage medium.

4. A preconditioned air system according to claim 3, wherein the thermal energy storage medium is selected from a group consisting of: a concentrated liquid desiccant medium, a chilled water storage medium, a hydrate cooling medium, and an ice storage medium.

5. A preconditioned air system according to claim 3, wherein the thermal energy storage unit comprises a fin and tube type-heat exchanger in contact with the thermal energy storage medium.

6. A preconditioned air system according to claim 1, wherein the thermal energy storage unit is disposed within a refrigeration circuit of the air cooling unit, such that the thermal energy storage unit functions as a condenser for the air cooling unit.

7. A method of providing preconditioned air for cooling an interior cabin space of a parked aircraft, comprising:
provided a thermal energy storage medium in thermal communication with a ground-based air-cooling unit;
operating the ground-based air-cooling unit in a first operating mode during a first period of time, the first operating mode for charging the thermal energy storage medium;
during a second period of time, providing a flow of air at a first temperature in thermal communication with the thermal energy storage medium, so as to discharge the thermal energy storage medium during the second period of time and to thereby change the temperature of the flow of air from the first temperature to a second temperature that is lower than the first temperature; and,
directing the flow of air at the second temperature to an interior cabin space of the parked aircraft.

8. A method according to claim 7, wherein the first period of time is an off-peak electricity demand period of time.

9. A method according to claim 8, wherein the second period of time is a time of electricity demand that is higher than the off-peak electricity demand period of time.

10. A method according to claim 8, wherein the second period of time is a peak electricity demand period of time.

11. A method according to claim 8, wherein providing the thermal energy storage medium in thermal communication with the ground-based air-cooling unit comprises providing a thermal storage unit containing the thermal energy storage medium.

12. A method according to claim 8, wherein providing the flow of air at the first temperature comprises using the ground-based air-cooling unit to cool a volume of air to the first temperature from a third temperature that is higher than the first temperature.

13. A method according to claim 8, wherein providing the flow of air at the first temperature comprises providing ambient air at the first temperature.

14. A method according to claim 8, wherein charging the thermal energy storage medium comprises storing cooling capacity of the ground-based air-cooling unit within the thermal energy storage medium for use in cooling the interior cabin space of a parked aircraft subsequent to charging.

* * * * *